US009591942B2

United States Patent
Chiu (10) Patent No.: US 9,591,942 B2
(45) Date of Patent: Mar. 14, 2017

(54) ADJUSTABLE PERCOLATION DEVICE AND PRESSURE PERCOLATION DEVICE COMPRISING THE SAME

(71) Applicant: Hsiang-Lan Chiu, Tainan (TW)

(72) Inventor: Hsiang-Lan Chiu, Tainan (TW)

( * ) Notice: Subject to any disclaimer, the term of this patent is extended or adjusted under 35 U.S.C. 154(b) by 195 days.

(21) Appl. No.: 14/455,265

(22) Filed: Aug. 8, 2014

(65) Prior Publication Data

US 2016/0037959 A1 Feb. 11, 2016

(51) Int. Cl.
| | | |
|---|---|---|
| A47J 31/20 | (2006.01) | |
| A47J 31/40 | (2006.01) | |
| A47J 31/24 | (2006.01) | |
| A47J 31/00 | (2006.01) | |
| A47J 31/06 | (2006.01) | |

(52) U.S. Cl.
CPC .......... *A47J 31/24* (2013.01); *A47J 31/005* (2013.01); *A47J 31/0626* (2013.01); *A47J 31/0663* (2013.01); *A47J 31/20* (2013.01)

(58) Field of Classification Search
CPC ...... A47J 31/24; A47J 31/0626; A47J 31/005; A47J 31/0663; A47J 31/20; A47J 31/56; A47J 31/4403; A47J 31/02; A47J 31/057; A47J 31/007; A47J 31/053; A47J 31/4485; A47J 31/401; A47J 31/06; A47J 31/0605; A47G 19/16; A23G 9/045; B65D 85/8043; A01J 25/112; A23L 3/365
USPC ..... 99/302 R, 323, 275, 279, 287, 283, 284, 99/295, 299, 300, 306, 309, 310, 323.1, 99/323.3, 452, 454, 483, 289 R
See application file for complete search history.

(56) References Cited

U.S. PATENT DOCUMENTS

| | | | | | |
|---|---|---|---|---|---|
| 3,077,156 | A | * | 2/1963 | Egi | A47J 31/303 99/285 |
| 5,570,623 | A | * | 11/1996 | Lin | A47J 41/0077 99/285 |
| 5,943,946 | A | * | 8/1999 | Chen | A47J 31/20 99/297 |
| 6,062,127 | A | * | 5/2000 | Klosinski | A47J 31/005 99/295 |
| 6,561,080 | B1 | * | 5/2003 | Feeney | A47J 31/24 99/295 |
| 7,849,784 | B2 | * | 12/2010 | Adler | A47J 31/02 99/287 |
| 8,234,971 | B2 | * | 8/2012 | Cerroni | A47J 31/005 99/287 |
| 2013/0078342 | A1 | * | 3/2013 | Loebl | A47J 31/005 426/115 |

(Continued)

*Primary Examiner* — Quang D Thanh
*Assistant Examiner* — Hemant Mathew
(74) *Attorney, Agent, or Firm* — Muncy, Geissler, Olds & Lowe, P.C.

(57) ABSTRACT

An adjustable percolation device and a pressure percolation device including the same are provided to overcome the inconveniences of usage in conventional technologies. The adjustable percolation device includes a first container, configured with an adjusting plate; a second container, configured with a filter and movably connected to the first container; and an inner cup, having a cup wall and a cup bottom configured with a plurality of second slits corresponding to a plurality of first slits. The pressure percolation device including the adjustable percolation device further includes a pressure unit having a sealing portion, wherein an edge of the sealing portion attaches to an inner edge of the cup wall.

14 Claims, 6 Drawing Sheets

(56) References Cited

U.S. PATENT DOCUMENTS

2014/0205725 A1\* 7/2014 Albanese ................ A47J 31/20
426/433

\* cited by examiner

ADJUSTABLE PERCOLATION DEVICE AND PRESSURE PERCOLATION DEVICE COMPRISING THE SAME

FIELD OF THE INVENTION

The invention relates to an adjustable percolation device and a pressure percolation device comprising the same, and more particularly, to a percolation device for adjusting water amount and filtering brew substances.

BACKGROUND OF THE INVENTION

When brewing coffee using conventional percolation processes, the brewing process cannot be completed by pouring in hot water for a single time; instead, there is enough space for continuing to add hot water only after the poured hot water has dissolved the coffee and is filtered by the filter, and the process is repeated until the designated coffee amount has been reached; therefore, the brewing process is less than convenient. In addition, the holding hand controls the amount of added water during the pouring of water, and thus water is often added in excess and causing the water to overflow the filter and flow into the cup, which results in the non-uniform concentration of the coffee in the cup and the degradation of the taste. Therefore, conventional technologies suffer from inconvenience for usage.

SUMMARY OF THE INVENTION

The present invention provides an adjustable percolation device comprising a first container, a second container, and an inner cup. The first container is configured with an adjusting plate dividing the first container into an upper chamber and a lower chamber, wherein the adjusting plate is configured with a plurality of first slits. The second container is configured with a filter defining a first containing space in the second container, wherein the second container is movably connected to the first container, and wherein the first containing space of the second container is in communication with the lower chamber of the first container. The inner cup is configured in the upper chamber and has a second containing space, wherein the inner cup comprises a cup bottom configured with a plurality of second slits corresponding to the plurality of first slits, and wherein the inner cup is movably configured on the adjusting plate so that the cup bottom is attached to the adjusting plate and movable with respect to the adjusting plate, wherein the second containing space is communicated with the lower chamber when the plurality of first slits are aligned with the plurality of second slits, and wherein the second containing space is isolated from the lower chamber when the plurality of first slits are staggered from the plurality of second slits.

The present invention further provides a pressure percolation device comprising the adjustable percolation device, which further comprises a pressure unit configured in the second containing space and comprising a sealing portion, wherein an edge of the sealing portion attaches to an inner edge of the cup wall, wherein the second containing space is communicated with the lower chamber by aligning the plurality of first slits with the plurality of second slits, and wherein the second containing space, the lower chamber, and the first containing space are communicated with each other and subject to a pressure when the pressure unit moves towards the cup bottom.

Preferably, the first container comprises a first inserting end, and the second container comprises a second inserting end, wherein the first inserting end engages with the second inserting end.

Preferably, the second inserting end of the second container is configured with a first O-ring.

Preferably, the present invention further comprises a handle configured with a first joining portion, and the second container is configured with a second joining portion, and wherein the first joining portion joins with the second joining portion.

Preferably, a holding portion is configured at an edge of the inner cup.

Preferably, a stopping edge is configured at a rim of the first container, wherein the stopping edge is configured with a notch, wherein the edge of the inner cup abuts the stopping edge while the holding portion is placed in the notch, and wherein the holding portion is stopped by the stopping edge when the inner cup is attached to the adjusting plate and moves with respect to the adjusting plate by a distance.

Preferably, the pressure unit is configured with a knob.

Preferably, the edge of the sealing portion of the pressure unit is configured with a second O-ring.

The invention may have the following effects:

(1) The inner cup comprises a cup bottom configured with a plurality of second slits corresponding to the plurality of first slits, wherein the inner cup is movably configured on the adjusting plate so that the cup bottom is attached to the adjusting plate and movable with respect to the adjusting plate, wherein the second containing space is communicated with the lower chamber by aligning the plurality of first slits with the plurality of second slits, and wherein the second containing space is isolated from the lower chamber by staggered the plurality of first slits from the plurality of second slits. More particularly, when the inner cup contains water for percolation, the amount of water flowing from the second containing space into the first containing space may be adjusted by moving the inner cup.

(2) The first inserting end engages with the second inserting end to enhance the tightness and convenience of connection between the first container and the second container.

(3) The second inserting end of the second container is configured with a first O-ring to further enhance the tightness of connection between the first container and the second container.

(4) The handle is configured with a first joining portion, and the second container is configured with a second joining portion, wherein the first joining portion joins with the second joining portion to provide convenience in holding and facilitate carrying.

(5) A holding portion is configured at an edge of the inner cup for manually holding to facilitate moving the inner cup.

(6) A stopping edge is configured at a rim of the first container, wherein the stopping edge is configured with a notch. The edge of the inner cup abuts the stopping edge, and the holding portion is placed in the notch so that the holding portion is stopped by the stopping edge when the inner cup is attached to the adjusting plate and moves with respect to the adjusting plate by a distance. Therefore, the edge of the inner cup is stopped by the stopping edge and the relative position of the inner cup with respect to the first container is substantially fixed, and the holding portion has a moving range in the notch and is stopped by the stopping edge so that the inner cup has an adjustment range.

(7) The pressure unit is configured in the second containing space and comprises a sealing portion, wherein an edge of the sealing portion attaches to an inner edge of the cup wall, wherein the second containing space is communicated with the lower chamber by aligning the plurality of first slits with the plurality of second slits, and wherein the second containing space, the lower chamber, and the first containing space are communicated with each other and subject to a pressure when the pressure unit moves towards the cup bottom. As a result, the filtering efficiency is enhanced and the residue of the beverage on the filter is reduced.

(8) The pressure unit is configured with a knob to facilitate holding and applying force on the pressure unit.

(9) The edge of the sealing portion of the pressure unit is configured with a second O-ring to increase the air tightness of the sealing portion with the cup wall.

DETAILED DESCRIPTION OF THE INVENTION

Figure 1:
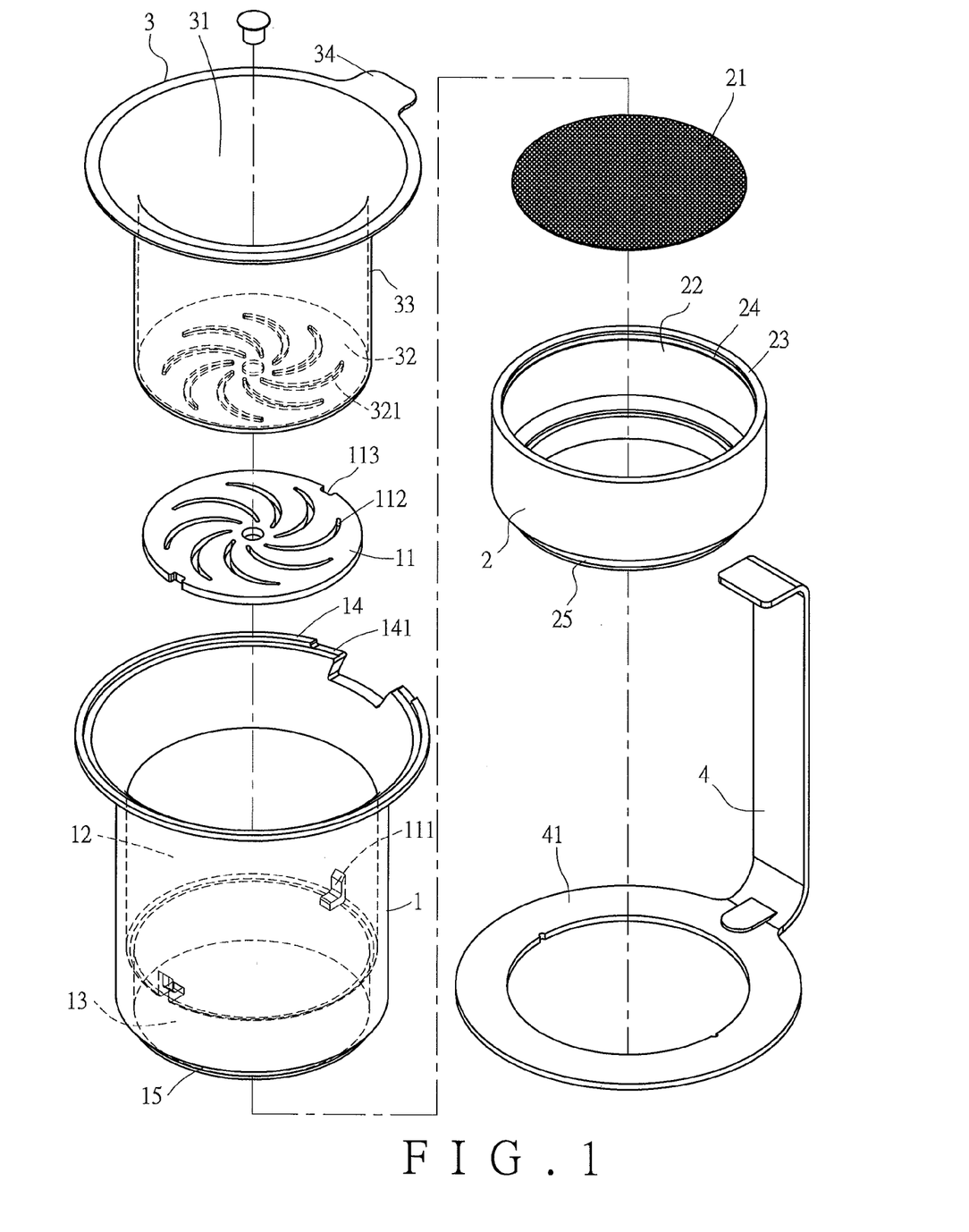
FIG. 1 is a perspective view of a first embodiment of the invention.
Figure 2:
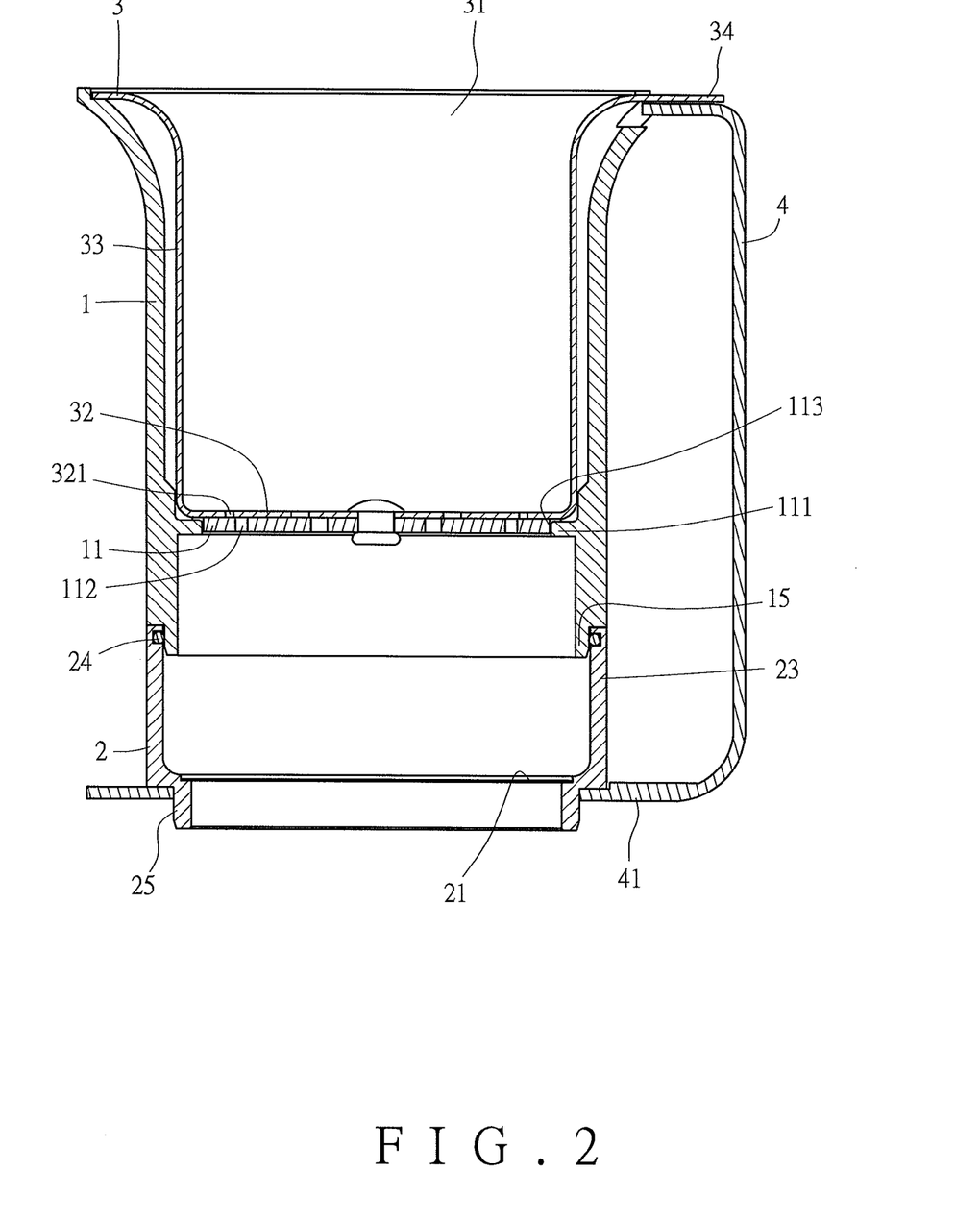
FIG. 2 is a cross-section assembly view of the first embodiment of the invention.

FIG. 1 and FIG. 2 show a first embodiment of the invention, comprising: a first container (1), a second container (2), and an inner cup (3). The first container (1) is hollow and cylindrical, wherein an adjusting plate (11) which is circular to conform with the inner diameter of the first container (1) and is riveted at the center to a cup bottom (32) of the inner cup (3) is configured therein, and wherein a stopping block (111) is configured at an inner surface of the first container (1). An indentation (113) is configured at a rim of the adjusting plate (11), wherein the stopping block (111) inserts into the indentation (113) to restrict the rotation of the adjusting plate (11) and divide the first container (1) into an upper chamber (12) and a lower chamber (13). The adjusting plate (11) is configured with a plurality of first slits (112) that is curved and uniformly configured on the adjusting plate (11).

The second container (2) is hollow and cylindrical, wherein a filter (21) is configured in the second container (2) and defines a first containing space (22). The second container (2) is movably connected to the first container (1) to communicate the lower chamber (13) of the first container (1) with the first containing space (22) of the second container (2). The first container (1) comprises a first inserting end (15), and the second container (2) comprises a second inserting end (23) configured to engage with the first inserting end (15). Preferably, the second inserting end (23) of the second container (2) is configured with a first O-ring (24) to enhance the tightness and convenience of the connection between the first container (1) and the second container (2).

The inner cup (3) is configured in the upper chamber (12) of the first container (1) and has a second containing space (31). The inner cup (3) comprises a cup wall (33). The cup bottom (32) of the inner cup (3) is configured with a plurality of second slits (321) corresponding to the plurality of first slits (112), wherein the plurality of second slits (321) are curved and uniformly configured on the cup bottom (32) similar to the plurality of first slits (112) configured on the adjusting plate (11). The inner cup (3) is movably configured on the adjusting plate (11), and the center of the cup bottom (32) is riveted to the adjusting plate (11) configured on the stopping block (111) so that the cup bottom (32) is attached to the adjusting plate (11) and rotatable with respect to the adjusting plate (11). Furthermore, a holding portion (34) is configured at an edge of the inner cup (3) for manually holding to facilitate rotating the inner cup (3). A stopping edge (14) is configured at a rim of the first container (1), wherein the stopping edge (14) is configured with a notch (141). The edge of the inner cup (3) abuts the stopping edge (14), and the holding portion (34) is placed in the notch (141) so that the holding portion (34) may be stopped by the stopping edge (14) when the inner cup (3) attached to the adjusting plate (11) moves with respect to the adjusting plate (11) by a distance. Therefore, the relative position of the inner cup (3) with respect to the first container (1) is substantially fixed due to the moving range of the holding portion (34) in the notch (141), thus defining an adjusting range of the inner cup (3).

Figure 3A:
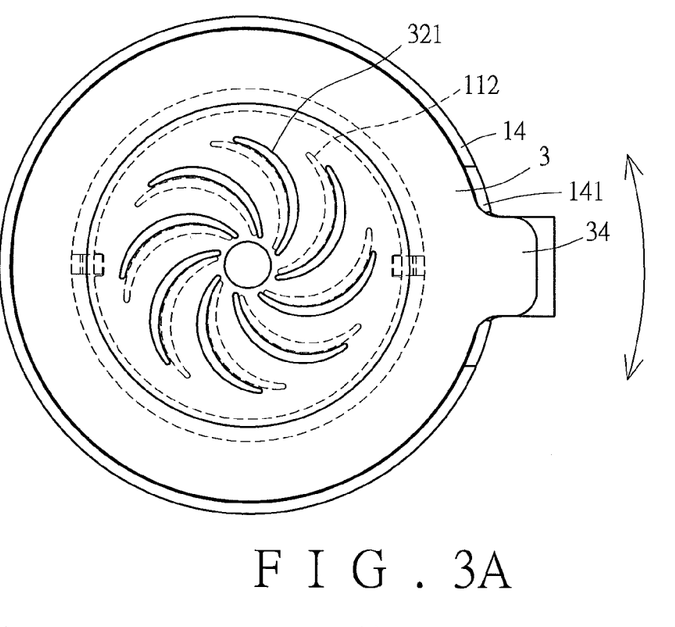
FIG. 3A is a schematic view of the action between a cup bottom and an adjusting plate in accordance with an embodiment of the invention.
Figure 3B:
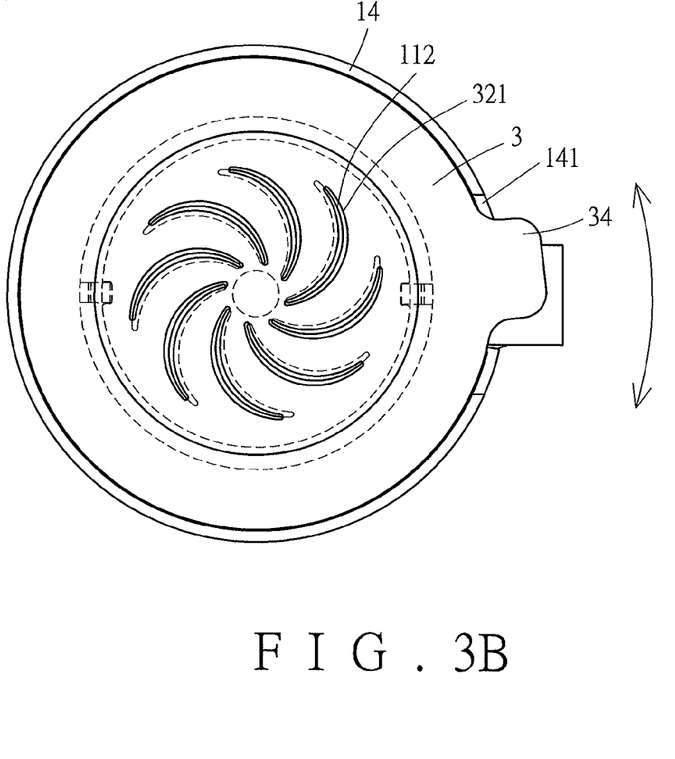
FIG. 3B is another schematic view of the action between the cup bottom and the adjusting plate in accordance with an embodiment of the invention.

Referring to FIG. 1, FIG. 3A, and FIG. 3B, the second containing space (31) is in communication with the lower chamber (13) when the plurality of first slits (112) are aligned with the plurality of second slits (321), and the second containing space (31) is isolated from the lower chamber (13) when the plurality of first slits (112) are staggered from the plurality of second slits (321); therefore, by changing the area of the plurality of first slits (112) overlapping with the plurality of second slits (321), the amount of water passing may be controlled and thus adjustment effects may be achieved, wherein no overlap corresponds to no water passing and complete overlap corresponds to maximum water passing.

The invention further comprises a handle (4) configured with a first joining portion (41), wherein the second container (2) is configured with a second joining portion (25), and wherein the first joining portion (41) is an annular plate having an opening fitting with the second joining portion (25) to provide convenience in holding and facilitate carrying.

Figure 4:
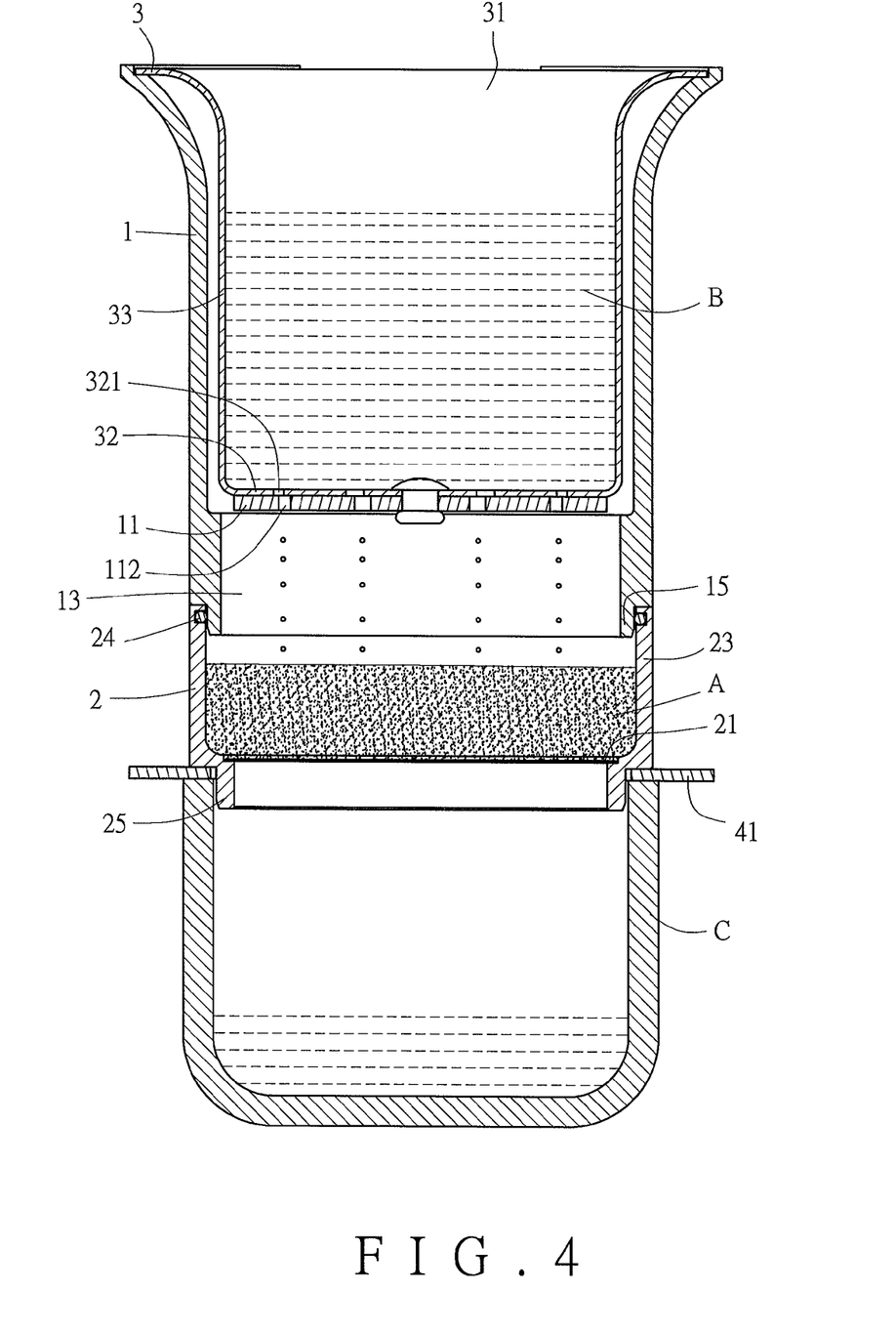
FIG. 4 is a cross-section view showing how the first embodiment of the invention is operated.

FIG. 4 is a cross section view showing how the first embodiment of the invention is operated, where the brew substance (A) to be brewed is placed in the first containing space (22), the first container (1) is subsequently assembled on the second container (2), and then the second container (2) is joined with the handle (4). After that, the assembled first container (1), second container (2), and handle (4) are placed on a cup (C). Subsequently, water (B) is poured into the second containing space (31) and the holding portion (34) is held to rotate the inner cup (3) so as to adjust the relative position of the plurality of first slits (112) with respect to the plurality of second slits (321) and further control the amount of water (B) flowing into the first containing space (22); the brew substance (A) dissolves in the water (B) and subsequently flows into the cup (C) after being filtered by the filter (21). Therefore, the amount of added water is conveniently controlled and the inconveniences of usage in conventional technologies are overcome.

Figure 5:
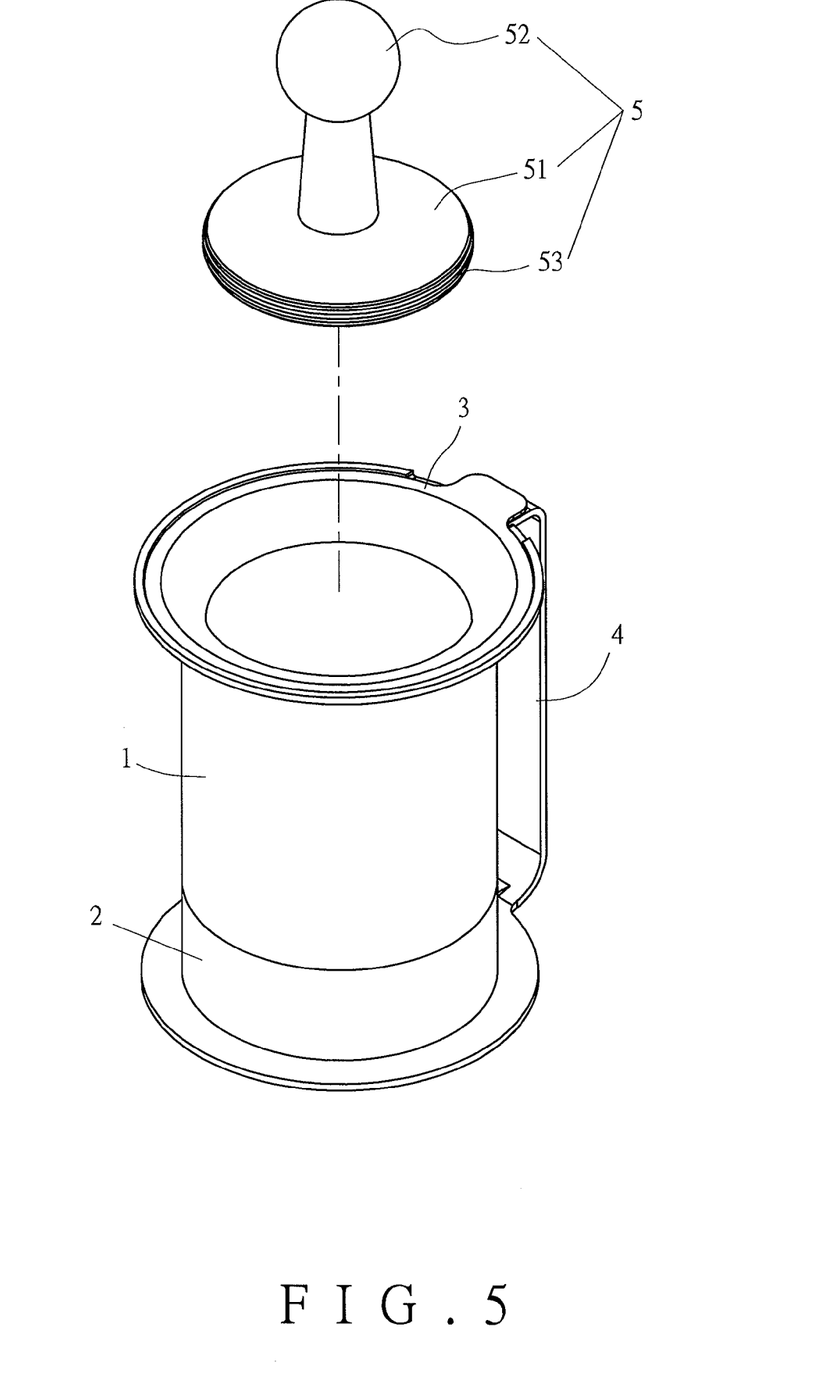
FIG. 5 is a perspective view of a second embodiment of the invention.

FIG. 5 shows a perspective view of a second embodiment of the invention, which is a pressure percolation device comprising the adjustable percolation device and further comprising a pressure unit (5). The pressure unit (5) is configured in the second containing space (31) and comprises a sealing portion (51), wherein an edge of the sealing portion (51) attaches to an inner edge of the cup wall (33) of the inner cup (3). When the second containing space (31) is communicated with both the lower chamber (13) and the first containing space (22) by aligning the plurality of first slits (112) with the plurality of second slits (321), the pressure unit (5) may move towards the cup bottom (32) to apply a pressure to the second containing space (31), the lower chamber (13), and the first containing space (22).

Preferably, the pressure unit (5) is configured with a knob (52) to facilitate holding and applying force on the pressure unit (5). The edge of the sealing portion (51) of the pressure unit (5) is configured with a second O-ring (53) with an X-shaped cross section to increase the air tightness of the sealing portion (51) with the cup wall (33).

Figure 6:
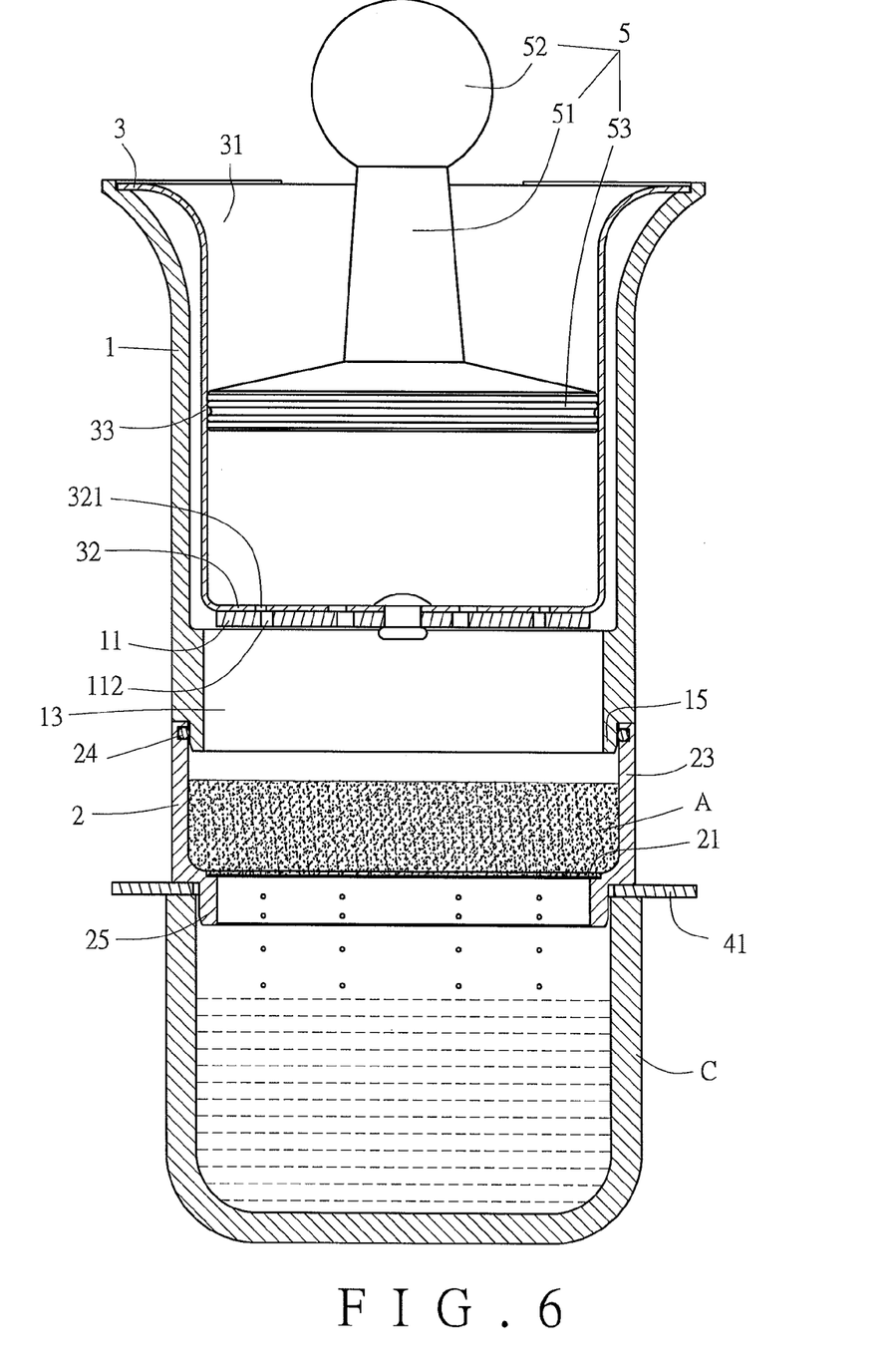
FIG. 6 is a cross-section view showing how the second embodiment of the invention is operated.

FIG. 6 is a cross section view showing how the second embodiment of the invention is implemented, where the adjustable percolation device of the invention is operated along with pressure unit (5). The second containing space (31), the lower chamber (13), and the first containing space (22) are communicated with each other and subject to a pressure by moving the pressure unit (5) towards the cup bottom (32) so that the filtering efficiency is enhanced and the residue of the beverage on the filter (21) is reduced.

The invention claimed is:

1. An adjustable percolation device, comprising:
   a first container, having an open bottom, configured with an adjusting plate dividing the first container into an upper chamber and a lower chamber, wherein the adjusting plate is configured with a plurality of first slits;
   a second container, configured with a filter defining a first containing space in the second container, wherein the second container is movably connected to the bottom of the first container, and wherein the first containing space of the second container is in communication with the lower chamber of the first container; and
   an inner cup, configured in the upper chamber and having a second containing space, wherein the inner cup comprises a cup bottom configured with a plurality of second slits corresponding to the plurality of first slits, and wherein the inner cup is movably configured on the adjusting plate so that the cup bottom is attached to the adjusting plate and rotatably movable with respect to the adjusting plate,
   wherein the second containing space is communicated with the lower chamber when the plurality of first slits are aligned with the plurality of second slits, and wherein the second containing space is isolated from the lower chamber when the plurality of first slits are staggered from the plurality of second slits, so that water in said inner cup flows, in order, through said first and second slits when aligned, into said lower chamber, and through said filter to exit the percolation device.

2. The adjustable percolation device as claimed in claim 1, wherein the first container comprises a first inserting end, and the second container comprises a second inserting end, and wherein the first inserting end engages with the second inserting end.

3. The adjustable percolation device as claimed in claim 2, wherein the second inserting end of the second container is configured with a first O-ring.

4. The adjustable percolation device as claimed in claim 1, further comprising:
   a handle, configured with a first joining portion, wherein the second container is configured with a second joining portion, and wherein the first joining portion joins with the second joining portion.

5. The adjustable percolation device as claimed in claim 1, wherein a holding portion is configured at an edge of the inner cup.

6. The adjustable percolation device as claimed in claim 5, wherein a stopping edge is configured at a rim of the first container, wherein the stopping edge is configured with a notch, wherein the edge of the inner cup abuts the stopping edge and the holding portion is placed in the notch, and wherein the holding portion is stopped by the stopping edge when the inner cup is attached to the adjusting plate and moves with respect to the adjusting plate by a distance.

7. A pressure percolation device, comprising:
   a first container, having an open bottom, configured with an adjusting plate dividing the first container into an upper chamber and a lower chamber, wherein the adjusting plate is configured with a plurality of first slits;
   a second container, configured with a filter defining a first containing space in the second container, wherein the second container is movably connected to the bottom of the first container, and wherein the first containing space of the second container is in communication with the lower chamber of the first container;
   an inner cup, configured in the upper chamber of the first container and defining a second containing space, wherein the inner cup comprises a cup wall and a cup bottom, wherein the cup bottom is configured with a plurality of second slits corresponding to the plurality of first slits, and wherein the inner cup is movably configured on the adjusting plate so that the cup bottom is attached to the adjusting plate and rotatably moveable with respect to the adjusting plate; and
   a pressure unit, configured in the second containing space and comprising a sealing portion, wherein an edge of the sealing portion attaches to an inner edge of the cup wall,
   wherein the second containing space is communicated with the lower chamber when the plurality of first slits are aligned with the plurality of second slits, and wherein the second containing space, the lower chamber, and the first containing space are communicated with each other and subject to a pressure when the pressure unit moves towards the cup bottom, so that water in said inner cup flows, in order, through said first and second slits when aligned, into said lower chamber, and through said filter to exit the percolation device.

8. The pressure percolation device as claimed in claim 7, wherein the first container comprises a first inserting end, and the second container comprises a second inserting end, and wherein the first inserting end engages with the second inserting end.

9. The pressure percolation device as claimed in claim 8, wherein the second inserting end of the second container is configured with a first O-ring.

10. The pressure percolation device as claimed in claim 7, further comprising:
    a handle, configured with a first joining portion, wherein the second container is configured with a second joining portion, and wherein the first joining portion joins with the second joining portion.

11. The pressure percolation device as claimed in claim 7, wherein a holding portion is configured at an edge of the inner cup.

12. The pressure percolation device as claimed in claim 11, wherein a stopping edge is configured at a rim of the first container, wherein the stopping edge is configured with a notch, wherein the edge of the inner cup abuts the stopping edge and the holding portion is placed in the notch, and wherein the holding portion is stopped by the stopping edge when the inner cup is attached to the adjusting plate and moves with respect to the adjusting plate by a distance.

13. The pressure percolation device as claimed in claim 7, wherein the pressure unit is configured with a knob.

14. The pressure percolation device as claimed in claim 7, wherein the edge of the sealing portion of the pressure unit is configured with a second O-ring.

\* \* \* \* \*

UNITED STATES PATENT AND TRADEMARK OFFICE
CERTIFICATE OF CORRECTION

PATENT NO. : 9,591,942 B2  
APPLICATION NO. : 14/455265  
DATED : March 14, 2017  
INVENTOR(S) : Chiu et al.

Page 1 of 1

It is certified that error appears in the above-identified patent and that said Letters Patent is hereby corrected as shown below:

On the Title Page

Item (72) inventors, should read:  
(72) Inventor: Hsiang-Lan Chiu, Tainan (TW);  
          Chiao-Fei Hsu, Tainan City (TW)

Signed and Sealed this  
Thirtieth Day of October, 2018

Andrei Iancu  
*Director of the United States Patent and Trademark Office*